United States Patent
Bhatti et al.

(10) Patent No.: US 6,826,948 B1
(45) Date of Patent: Dec. 7, 2004

(54) LEAK DETECTION APPARATUS FOR A LIQUID CIRCULATION COOLING SYSTEM

(75) Inventors: Mohinder Singh Bhatti, Amherst, NY (US); Ilya Reyzin, Williamsville, NY (US); Donald John Enzinna, Lockport, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/684,069

(22) Filed: Oct. 9, 2003

(51) Int. Cl.$^7$ .......................... G01M 3/04; G08B 21/00
(52) U.S. Cl. ................. 73/40.5 R; 73/49.1; 73/49.5; 340/605
(58) Field of Search ............................ 73/40.5 R, 49.1, 73/49.5; 702/51, 551; 340/605; 138/104

(56) References Cited

U.S. PATENT DOCUMENTS

| | | | | |
|---|---|---|---|---|
| 3,721,970 A | * | 3/1973 | Niemoth | 340/605 |
| 4,041,771 A | * | 8/1977 | Allan et al. | 73/40.5 R |
| 4,380,168 A | * | 4/1983 | Ibe | 73/40.5 R |
| 4,446,892 A | * | 5/1984 | Maxwell | 138/104 |
| 4,589,275 A | * | 5/1986 | Thomas et al. | 73/40.5 R |
| 4,864,847 A | * | 9/1989 | Anderson et al. | 73/40.7 |
| 4,870,477 A | | 9/1989 | Nakanishi et al. | |
| 4,896,527 A | * | 1/1990 | Akiba | 73/40.5 R |
| 4,918,977 A | * | 4/1990 | Takahashi et al. | 73/40.5 R |
| 4,922,232 A | | 5/1990 | Bosich | |
| 4,926,129 A | * | 5/1990 | Wasley et al. | 324/555 |
| 4,974,739 A | | 12/1990 | Gelin | |
| 5,086,829 A | | 2/1992 | Asakawa | |
| 5,172,730 A | | 12/1992 | Driver | |
| 5,176,025 A | | 1/1993 | Butts | |
| 5,279,148 A | * | 1/1994 | Brandes | 73/40.5 R |
| 5,341,128 A | * | 8/1994 | Keyser et al. | 340/605 |
| 5,918,267 A | | 6/1999 | Evans et al. | |
| 6,175,310 B1 | * | 1/2001 | Gott | 340/605 |
| 6,550,499 B1 | * | 4/2003 | Pai | 138/104 |
| 2001/0018845 A1 | * | 9/2001 | Roberts | 73/40 |
| 2003/0094033 A1 | * | 5/2003 | Gibbs | 73/40 |

* cited by examiner

Primary Examiner—Michael Cygan
(74) Attorney, Agent, or Firm—Patrick M. Griffin

(57) ABSTRACT

A leak detection apparatus includes one or more detection devices that envelope the various pipe joints of a liquid circulation cooling system. In one approach, the detection devices include a pair of conductors separated by a wicking material impregnated with a crystalline salt that provides a low resistance electrical path between the conductors in the presence of a leak. In another approach, the detection devices include a pair of dissimilar metal mesh electrodes separated by an electrolyte-impregnated wicking material to form a water-activated battery that energizes an alarm in the presence of a leak. In either case, the electrodes and wicking material may be encased with a water-activated sealing material that hardens in the presence of a leak to contain the leakage.

16 Claims, 5 Drawing Sheets

LEAK DETECTION APPARATUS FOR A LIQUID CIRCULATION COOLING SYSTEM

TECHNICAL FIELD

The present invention is directed to liquid circulation cooling systems for electronic devices and the like, and more particularly to apparatus for detecting, locating and isolating coolant leaks at the pipe joints of such systems.

BACKGROUND OF THE INVENTION

Liquid cooling is finding increased application in the electronics industry due to the limited heat dissipation capability of forced air cooling systems and the desire to minimize cooling system noise levels. FIG. 1 depicts a liquid cooling system 10 for one or more heat producing electronic devices 12. The device 12 is typically mounted on a circuit board 14, and its upper surface is secured to a cold plate 16 of cooling system 10 by thermal paste, thermal interface material or other means so that heat generated by the device 12 is conducted to the cold plate 16. The cold plate 16 is provided with inlet and outlet pipes 16a, 16b through which a liquid coolant such as water or a water-glycol solution is circulated. The coolant is stored in a tank or reservoir 18, and a pump 20 draws coolant out of tank 18 for delivery to the cold plate inlet pipe 16a. Heated fluid exiting cold plate 16 through outlet pipe 16b is supplied to a heat exchanger 22 before being returned to the tank 18. A cooling fan 24 driven by electric motor 26 forces ambient air through the heat exchanger 22, so that the heat transferred from device 12 to the fluid in cold plate 16 is subsequently transferred from the fluid in heat exchanger 22 to circumambient air.

The potential for fluid leaks is a significant concern, particularly in electronic systems where the leaked fluid can damage various electronic devices and potentially create a risk of electrocution or fire. As in any liquid (single phase or multi-phase fluid) circulation system, the most likely sources of leakage in the system 10 are the pipe joints. In the system of FIG. 1, for example, the inlet 16a, 18a, 20a, 22a of each device 16, 18, 20, 22 is coupled to the outlet 16b, 18b, 20b, 22b of another device by a connecting pipe 28, 30, 32, 34, and there is a pipe joint at each such coupling. In the system of FIG. 1, the connecting pipes 28, 30, 32, 34 have an inside diameter that matches the outside diameter of the inlet or outlet pipe to which it is coupled, and a clamp 36 prevents the pipes from becoming uncoupled. Other possible coupling configurations are depicted in FIGS. 2–4, described herein. Although the coupled pipes can be soldered or otherwise sealed to prevent fluid leakage, the possibility of fluid leakage remains due to sealing defects or imperfections that occur over time.

Various systems have been devised to address the aforementioned leakage concerns, most of which include one or more leak detection devices and an alarm or other warning device to alert an operator upon detection of leakage. The detection device typically takes the form of a pair of electrodes separated by an absorbent material that is insulative in the absence of fluid but which dissolves or becomes conductive in the presence of fluid. A circuit responsive to the resistance between the electrodes activates the alarm when a change in resistance indicative of fluid leakage is detected. See, for example, the U.S. Pat. Nos. 4,922,232; 4,974,739; 5,172,730; 5,176,025; and 5,918,267 which pertain to leak detection in pipelines, and the U.S. Pat. Nos. 4,870,477 and 5,086,829, which pertain to leak detection for liquid circulation cooling systems.

SUMMARY OF THE INVENTION

The present invention is directed to an improved leak detection apparatus that is particularly suited to liquid circulation cooling systems having pipe joints, including detection devices that envelope the various pipe joints of the cooling system. According to a first embodiment, the detection devices comprise a pair of conductors separated by a wicking material impregnated with a crystalline salt that provides a low resistance electrical path between the conductors in the presence of a leak. According to a second embodiment, the detection devices comprise a pair of dissimilar metal mesh electrodes separated by an electrolyte-impregnated wicking material to form a water-activated battery that energizes an alarm in the presence of a leak. Both embodiments optionally are encased with a water-activated sealing material that hardens in the presence of a leak to contain the leakage.

BRIEF DESCRIPTION OF THE DRAWINGS

The present invention will now be described, by way of example, with reference to the accompanying drawings, in which:

FIG. 5A depicts a plan view, while FIG. 5B depicts a cross-sectional view taken along line I—I in FIG. 5A.

FIG. 7A depicts an exploded view of the water-activated battery, and FIG. 7B depicts the water-activated battery of FIG. 7A as applied to a pipe joint of the system of FIG. 1.

FIG. 8A depicts an exploded view of the water-activated battery and a pipe joint, and FIG. 8B depicts the water-activated battery of FIG. 7A as applied to the depicted pipe joint.

DESCRIPTION OF THE PREFERRED EMBODIMENT

Figure 1:
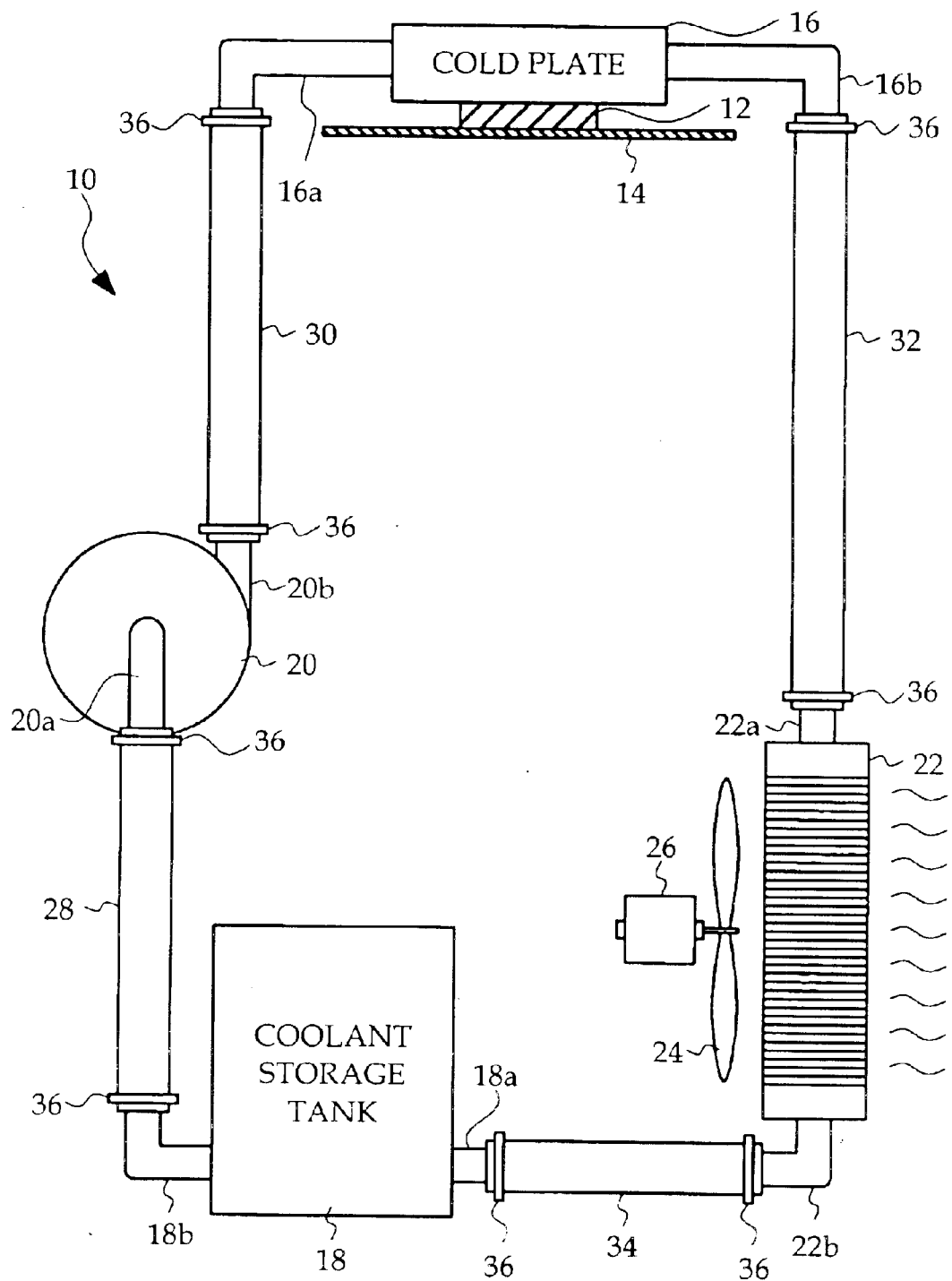
FIG. 1 is a diagram of a Prior Art liquid circulation cooling system for electronic devices.

The present invention is described in the context of a circulated water cooling system generally of the type designated by the reference numeral 10 in FIG. 1. However, it will be appreciated by those skilled in the art that the embodiments described herein are also applicable to other types of circulated liquid cooling systems, and also to systems with stagnant fluid as in pool-boiling.

Figure 2:
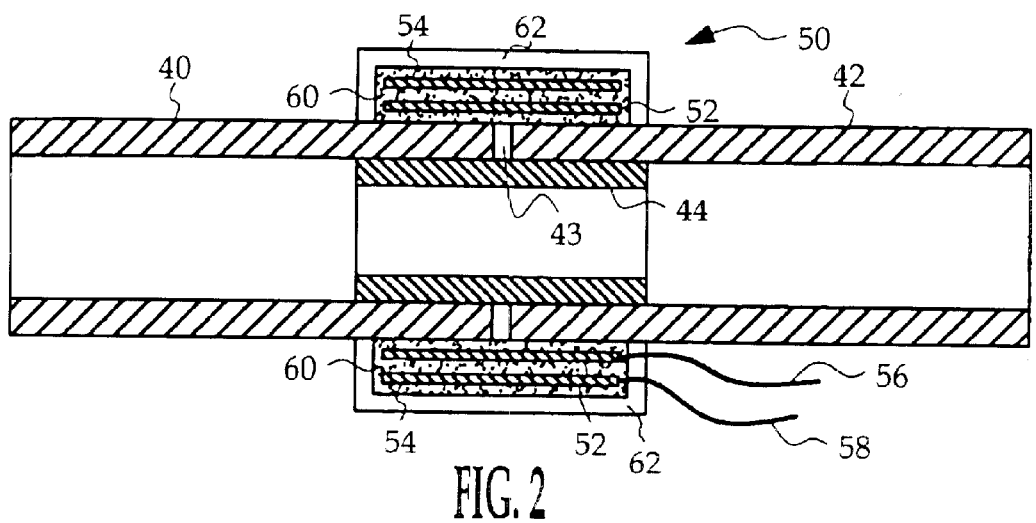
FIG. 2 depicts a leak detection and containment device for a pipe joint of the system of FIG. 1, including a pair of radially displaced conductor sleeves.
Figure 3:
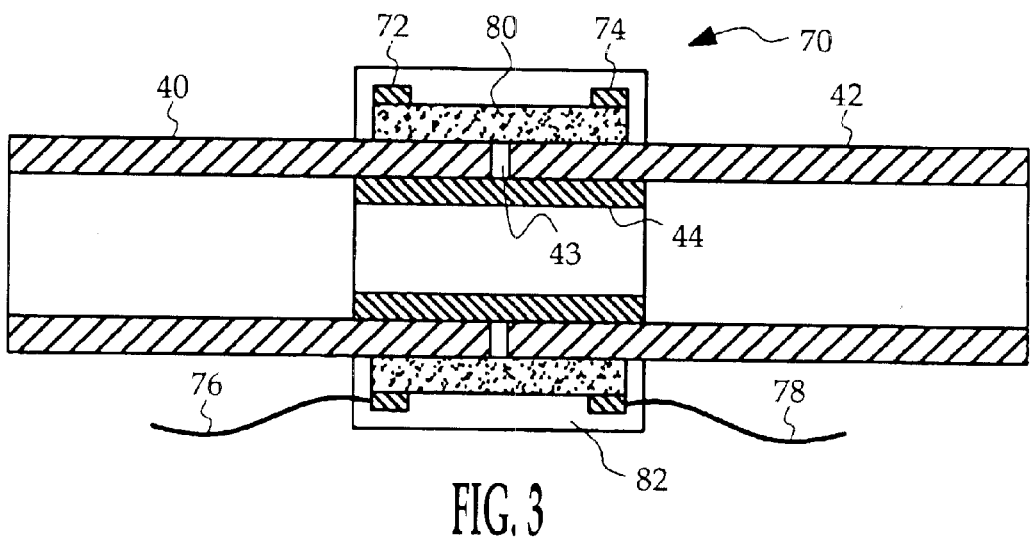
FIGS. 3 and 4 depict a leak detection and containment device for a pipe joint of the system of FIG. 1, including a pair of laterally displaced conductor bands. The device of FIG. 3 is depicted in the context of a butt-type pipe joint with an internal sleeve, and the device of FIG. 4 is depicted in the context of a barb-type pipe joint.

The embodiments depicted in FIGS. 2 and 3 are particularly applicable to cooling system pipe joints of the abutment type in which two similarly sized pipes 40 and 42 separated by a small gap 43 are joined by an internal sleeve 44 having an outside diameter equal to or slightly larger than the inside diameter of the pipes 40 and 42. Although not depicted in FIGS. 2–3, the sleeve 44 or the pipes 40, 42 may be coated with a sealing material that is compressed between the sleeve 44 and the pipes 40, 42 to prevent leakage of fluid circulated therethrough.

Figure 6:
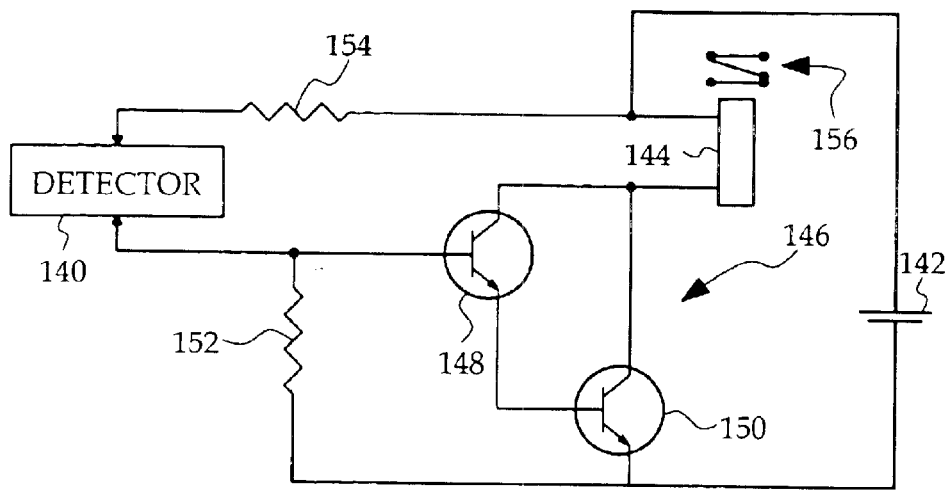
FIG. 6 depicts a leak detection circuit used in connection with the leak detection and containment devices of FIGS. 2, 3, 4 and 5A–5B.

Referring particularly to FIG. 2, the reference numeral 50 designates a leak detection and containment apparatus where the electrodes are defined by the radially spaced metal screens 52 and 54. The screens 52 and 54 may be formed of copper or aluminum for example, and are coupled to an external circuit such as depicted in FIG. 6 by the external conductors 56 and 58, respectively. The screens 52 and 54 are separated from the pipes 40, 42 and from each other by intervening layers of a wicking material 60 that absorbs coolant that may ooze from the pipe joint and acts to soak up and hold the oozing coolant until the joint can be repaired. The wicking material 60, which may be formed of felt for example, is preferably impregnated with a crystalline salt such as sodium-bicarbonate or sodium-chloride. When dry, the wicking material 60 is insulative in nature to establish a high-resistance electrical path between the screens 52 and 54; when moistened by leaking coolant at the pipe joint, the crystalline salt dissolves, forming a highly ionic low-resistance electrical path between the screens 52 and 54. In systems where the coolant itself is highly conductive, impregnation of the wicking material with crystalline salt can be omitted. If desired, the wicking material 60 can additionally be impregnated with a dry dye material such as cobalt chloride that is dissolved by leaking coolant; in such event, the dye produces a visible stain on the detection apparatus 50, allowing a user to visually identify the location of a detected leak. Optionally the screens 52, 54 and wicking material 60 are enveloped by a superincumbent layer of sealing material 62 designed to harden and seal the leak on contact with the coolant. If the coolant is water, for example, the sealing material may be a water-activated material such as hydrophobic polyurethane foam or resin, epoxy resin, sodium-polyacrylate gel, or simple plaster-of-paris. The apparatus 50 is preferably manufactured in the form of a rectangular strip that is wrapped around some or all of the pipe joints of the cooling system 10, particularly those joints located in proximity to sensitive electronic devices or other electrical equipment where a leak would cause damage and/or pose an electrical hazard.

Referring to FIG. 3, the reference numeral 70 designates a leak detection and containment apparatus where the electrodes are defined by the axially spaced metal bands 72 and 74. The bands 72 and 74 may be formed of copper or aluminum for example, and are coupled to an external circuit such as depicted in FIG. 6 by the external conductors 76 and 78, respectively. A sleeve of wicking material 80 surrounds the pipes 40, 42 in the vicinity of the gap 43, and the bands 72 and 74 are secured to opposite axial ends of the wicking material 80 as shown. As in the embodiment of FIG. 2, the wicking material 80 separates the bands 72 and 74 from the pipes 40, 42 and from each other; and additionally in this embodiment, the bands 72, 74 serve as clamps to hold the wicking material 80 in place. As discussed above, the wicking material 80 may be formed of felt for example, and is impregnated with a dry dye material and crystalline salt to facilitate both visual and electrical detection of coolant leakage. And as with the embodiment of FIG. 2, the bands 72, 74 and wicking material 80 are optionally enveloped by a superincumbent layer of sealing material 82 designed to harden and seal the leak on contact with the coolant.

Figure 4:
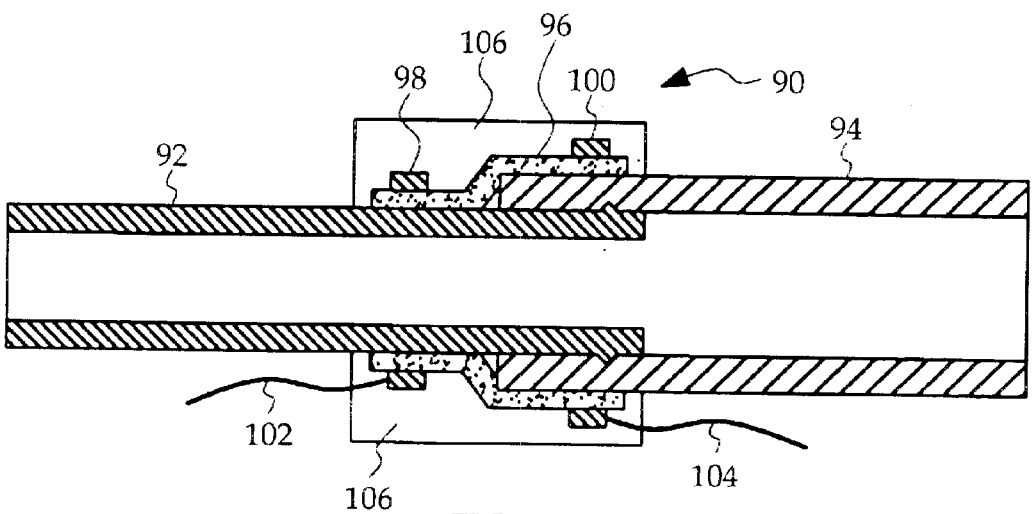

Referring to FIG. 4, the reference numeral 90 designates a leak detection and containment apparatus essentially as shown in FIG. 3, but as applied to a barb-type pipe joint between different sized pipes 92 and 94. As in the embodiment of FIG. 3, a sleeve of wicking material 96 surrounds the pipes 92, 94 in the vicinity of the pipe joint, and metal bands 98 and 100 are secured to opposite axial ends of the wicking material 96. Conductors 102 and 104 connect the bands 98 and 100 to an external circuit such as depicted in FIG. 6. And as with the embodiments of FIG. 2-3, the bands 92, 94 and wicking material 96 are optionally enveloped by a superincumbent layer of sealing material 106 designed to harden and seal the leak on contact with the coolant.

Figure 5A:
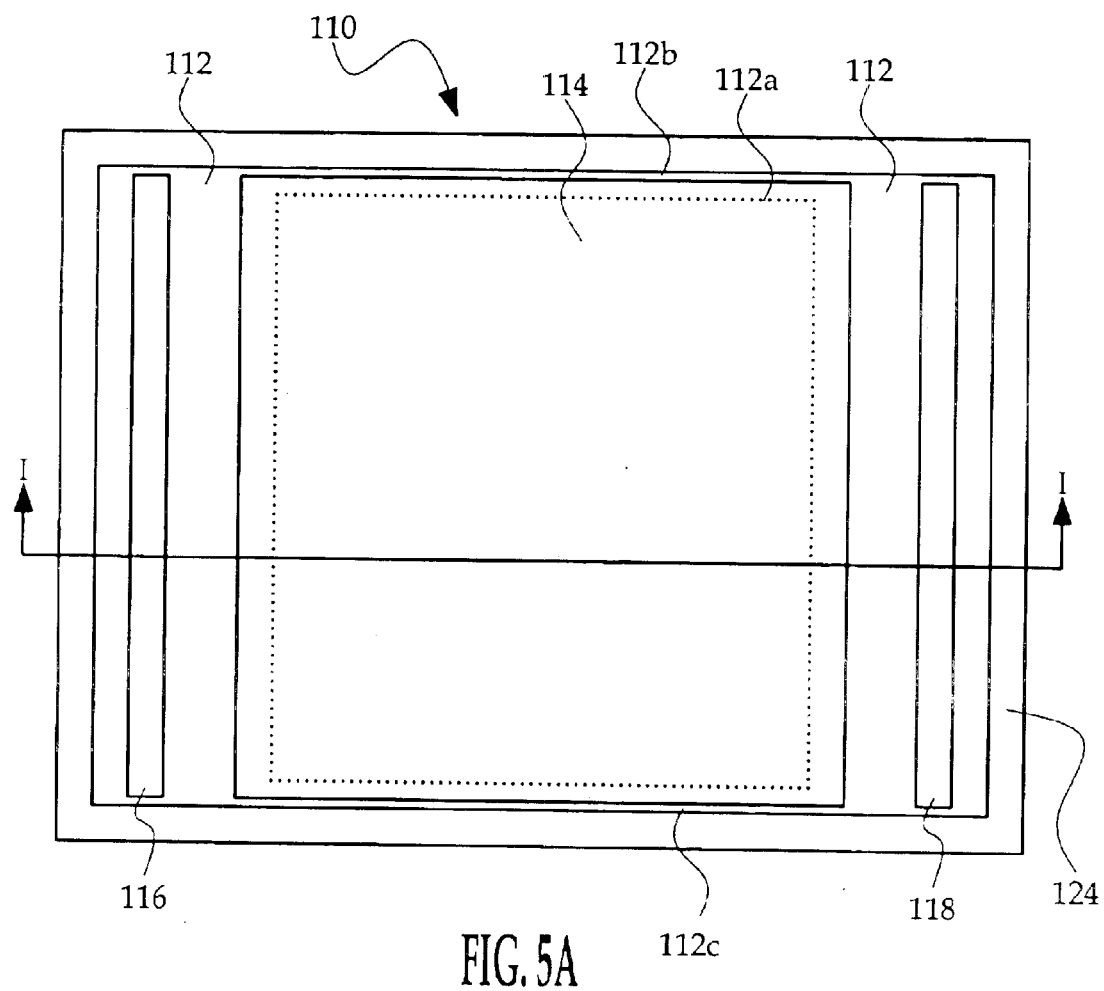
FIGS. 5A and 5B depict a patch-type leak detection and containment device according to this invention.
Figure 5B:
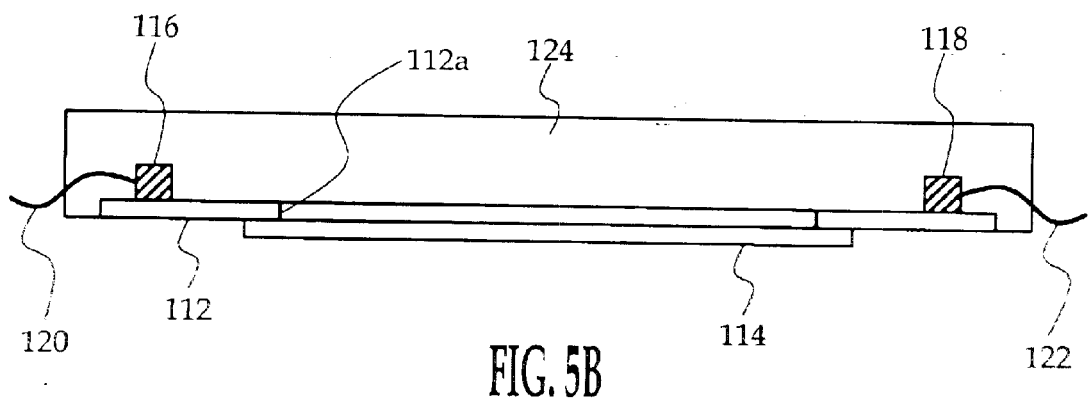

Referring to FIGS. 5A–5B, the reference numeral 110 generally designates a patch-type version of the above-described pipe joint leak detection devices that is particularly adapted for detecting leaks from a flat surface in the liquid cooling loop of cold plate 16. A sheet of metal foil tape 112 has a rectangular central opening 112a covered by a sheet of wicking material 114 that is somewhat larger than the opening 112a so that the margins of the wicking material 114 adhere to the foil tape 112. First and second conductor bars 116, 118 are adhered to foil tape 112 oppositely about the wicking material 114, so that the electrical resistance between conductor bars 116 and 118 is determined by the combined resistance of the intervening wicking material 114 and the marginal portions 112b, 112c of the foil tape 112. As the wicking material 114 moistens due to a coolant leak, the combined electrical resistance decreases, and a circuit such as depicted in FIG. 6 coupled to the conductor bars 116, 118 via wires 120, 122 detects the resistance drop as an indication of coolant leakage. As with the previously discussed embodiments, the wicking material 114 may be impregnated with dry dye and crystalline salts to facilitate visual and electrical leak detection, and the apparatus may be optionally enveloped by a superincumbent layer of sealing material 124 designed to harden and seal the leak on contact with the coolant.

FIG. 6 depicts a leak detection circuit designed to interface with the above-described leak detection devices, designated in FIG. 6 by the detector 140. A power source such as battery 142 is coupled to a relay coil 144 via a Darlington transistor pair 146 comprising the individual transistors 148 and 150. When the Darlington pair 146 is conductive, the relay coil 144 is energized to activate a set of contacts 156 that in turn activate an alarm to alert the operator that a coolant leak has been detected. The resistor 154 and leak detector 140 couple the base of transistor 148 to the positive terminal of battery 142, while the pull-down resistor 152 couples the base of transistor 148 to the negative terminal of battery 142. The normal resistance of detector 140 is relatively high so that the pull-down resistor 152 biases the Darlington pair 146 non-conductive. In the event of a coolant leak, however, the resistance of detector 140 drops precipitously, biasing the Darlington pair 146 conductive to activate the alarm. Advantageously, the circuit elements 144–154 may be replicated to provide a detection circuit for each leak detector present in a system 10.

FIGS. 7A–7B and 8A–8B depict leak detection devices having an integral coolant-activated battery that interfaces directly to an alarm device, thereby eliminating the need for remote resistance detection circuitry and batteries that must be periodically replaced.

Figure 7A:
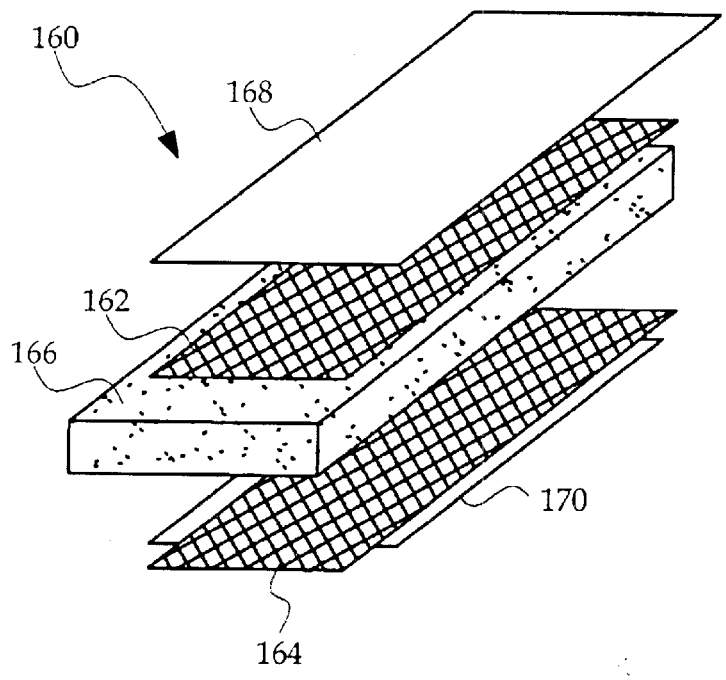
FIGS. 7A and 7B depict a wrap-type leak detection device according to this invention including a water-activated battery and alarm.
Figure 7B:
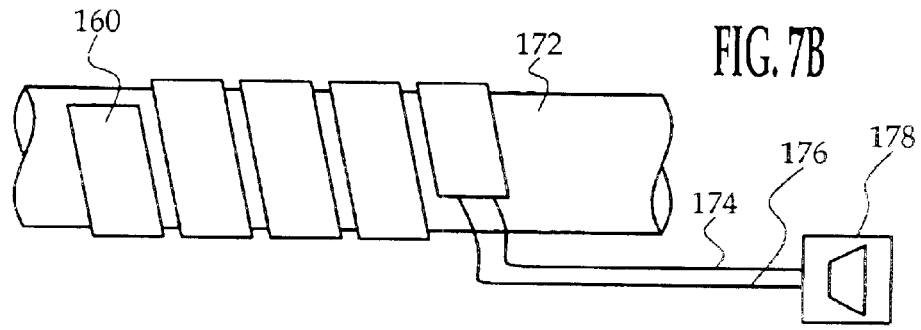

FIGS. 7A–7B depict a detection apparatus 160 in the form of an elongated strip that is intended to be wrapped around a pipe joint as depicted in FIG. 7B. When the integral battery is activated, an alarm 178 (such as a piezoelectric sounder)

coupled to the apparatus 160 via the wires 174 and 176 sounds to alert the operator or user of the coolant leakage. Referring to FIG. 7A, the apparatus 160 comprises first and second electrode strips 162 and 164 separated by a strip of wicking material 166, and upper and lower strips of porous fabric 168, 170 covering the electrode strips 162, 164. The porous fabric layers 168, 170 serve to protect the respective electrode strips 162, 164, and also to insulate the electrode strips 162, 164 from pipe 172, and from each other if the wrapping results in any overlap. The electrode strips 162, 164 are formed of a screen or mesh material so that leaked coolant soaks into the wicking material 166, and the wicking material is impregnated with crystalline electrolyte that is non-conductive in its dry state. In the illustrated mechanization, one of the electrode strips 162, 164 is formed of aluminum, while the other is formed of copper, so that an aluminum-copper cell is activated in the event of coolant leakage to produce an output voltage of approximately 1.2 volts across lines 174, 176. The current produced by the cell is proportional to the active area of the electrodes 162, 164, which increases as leaked coolant soaks into the wicking material 166. Other electrode combinations such as copper and magnesium are also possible.

Figure 8A:
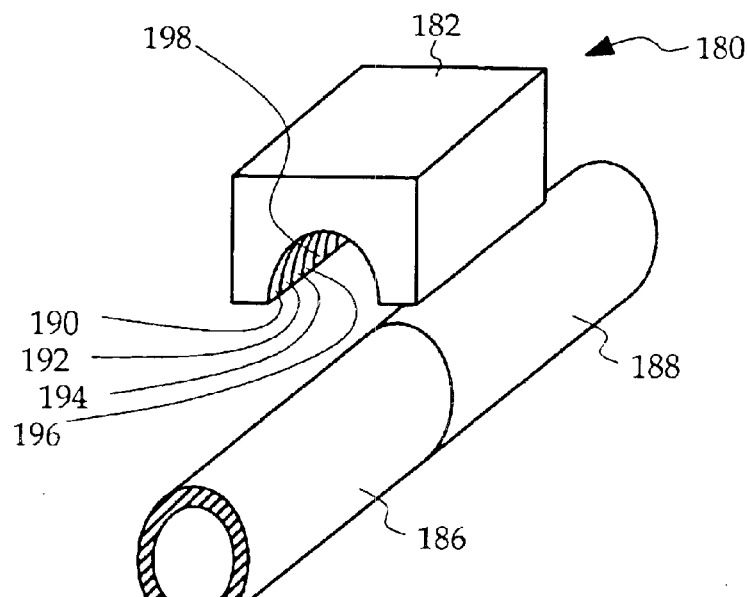
FIGS. 8A and 8B depict a block-type leak detection device according to this invention including a water-activated battery and alarm.
Figure 8B:
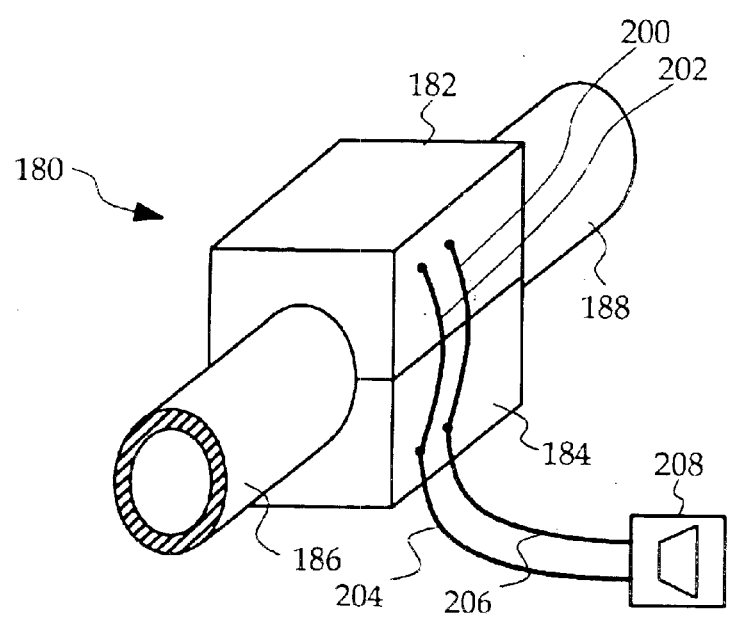

FIGS. 8A–8B depict a detection apparatus 180 comprising first and second blocks 182 and 184 that are clamped together about a butt-joint of two equal diameter pipes 186, 188. As depicted in FIG. 8A in respect to block 182, each of the blocks 182, 184 comprises a stack of plates that form one or more coolant activated battery cells. The exterior periphery of the stack is covered by an insulative layer 190, and each stack has a semi-cylindrical recess that is complementary to the exterior periphery of the pipes 186, 188. A porous insulative layer is also applied to the pipes 186, 188 in the event that the pipes 186,188 are conductive. Each battery cell includes an aluminum plate 192, a layer of wicking material 194 and a copper plate 196 in succession, and each cell is separated by an insulator plate 198. The various aluminum plates 192 are electrically coupled by internal inter-connects, as are the various copper plates 196. As shown in FIG. 8B, a pair of conductors 200, 202 couple the battery cells of blocks 182 and 184 in parallel, and the wires 204, 206 couple the battery cells to the alarm 208, which may be a piezoelectric sounder as mentioned above. As with the embodiment of FIGS. 7A–7B, the wicking material 194 is impregnated with crystalline electrolyte that is dissolved by leaked coolant to activate the battery cells.

In summary, the present invention provides a reliable and cost-effective means of quickly detecting and locating leaked coolant in a liquid-circulated cooling system 10. While the invention has been described in reference to the illustrated embodiments, it will be understood that various modifications in addition to those mentioned herein will occur to those skilled in the art. For example, the size and shape of the detection apparatus may be varied to suit a given application, materials other than those mentioned herein may be used, and so forth. Additionally, it is possible to apply two or more staged detection devices to a single location; in such a mechanization, initial coolant leakage is detected by a first detection device, and leakage detection by the second and subsequent detection devices indicates the extent of the leak. Also, the alarm circuitry may be effective to perform auto-shutdown or other functions in response to detection of a coolant leak Moreover, the leak detection apparatus may be applied as extensively in a system as desired, and need not be confined solely to the pipe joints. Thus, it will be understood that devices incorporating these and other modifications may fall within the scope of this invention, which is defined by the appended claims.

What is claimed is:

1. Leak detection apparatus for a liquid cooling system having coolant pipes and at least one pipe joint, comprising:

a wicking material applied to an exterior periphery of said pipe;

an electrical detector including first and second spaced electrodes formed of different metals and disposed on said wicking material;

a crystalline electrolyte activating agent impregnated into said wicking material that is operative when leaked coolant soaks into said wicking material for forming a coolant activated battery that produces an electrical voltage and current flow between said first and second electrodes when coolant leaks into said wicking material; and circuitry coupled to said electrical detector for indicating the presence of a coolant leak when said electrical voltage and current flow are produced.

2. The leak detection apparatus of claim 1, further comprising:

a superincumbent layer of material surrounding said electrical detector and wicking material that is operative on contact with said leaked coolant for hardening to form a seal that contains said leaked coolant.

3. The leak detection apparatus of claim 2, wherein said coolant is water, and said superincumbent layer is hydrophobic polyurethane.

4. The leak detection apparatus of claim 1, further comprising:

a dye material impregnated into said wicking material that is operative when leaked coolant soaks into said wicking material for dying said wicking material to provide a visual indicator of the leaked coolant.

5. The leak detection apparatus of claim 1, wherein:

said first and second electrodes are radially spaced about said pipe; and a portion of said wicking material is disposed between said first and second electrodes.

6. The leak detection apparatus of claim 5, wherein at least one of said first and second electrodes is a screen that allows said leaked coolant to soak into said portion of wicking material disposed between said first and second electrodes.

7. Leak detection apparatus for a liquid cooling system having coolant pipes and at least one pipe joint, comprising:

a wicking material applied to an exterior periphery of said pipe;

an electrical detector including first and second spaced electrodes disposed on said wicking material, said first and second electrodes being oppositely disposed about said pipe joint;

an activating agent impregnated into said wicking material that is operative when leaked coolant soaks into said wicking material for altering an electrical parameter of said electrical detector; and circuitry coupled to said electrical detector for indicating the presence of a coolant leak in response to said altering of said electrical parameter.

8. The leak detection apparatus of claim 7, wherein:

said first and second electrodes clamp said wicking material around said coolant pipes.

9. Leak detection apparatus for a liquid cooling system having coolant pipes and at least one pipe joint, comprising:

a wicking material applied to an exterior periphery of said pipe;

an electrical detector including first and second spaced electrodes disposed on said wicking material, said first and second electrodes being in the form of plates oriented substantially perpendicular to a longitudinal axis of said coolant pipe, with a portion of said wicking material being disposed between said first and second electrodes;

an activating agent impregnated into said wicking material that is operative when leaked coolant soaks into said wicking material for altering an electrical parameter of said electrical detector; and circuitry coupled to said electrical detector for indicating the presence of a coolant leak in response to said altering of said electrical parameter.

10. The leak detection apparatus of claim 9, wherein said first and second electrodes are formed of different metals, said activating agent is a crystalline electrolyte, and said altered electrical parameter is an electrical voltage and current flow between said first and second electrodes.

11. The leak detection apparatus of claim 10, wherein said electrical detector includes third and fourth electrodes formed of different metals, and electrically coupled to said first and second electrodes, respectively, to form a multi-cell coolant activated battery.

12. The leak detection apparatus of claim 9, wherein said first and second electrodes and said wicking material have a semi-cylindrical periphery that seats on said coolant pipe.

13. The leak detection apparatus of claim 12, wherein said electrical detector includes third and fourth plate electrodes and intervening wicking material having a semi-cylindrical periphery that seats on said coolant pipes about said coolant pipe in opposition to said first and second electrodes.

14. The leak detection apparatus of claim 13, wherein said first and second electrodes are electrically coupled to said third and fourth electrodes, respectively, to form a multi-cell coolant activated battery.

15. Leak detection apparatus for a liquid cooling system, comprising:

a metal foil member having a central opening, and adhesively secured to a component of said system;

an electrical detection including first and second spaced electrodes disposed on said foil member oppositely about said central opening;

a sheet of wicking material spanning the central opening of said foil member, and having marginal portions supported by said foil member;

an activating agent impregnated into said wicking material that is operative when leaked coolant at said component soaks into said wicking material for altering an electrical parameter of said electrical detector;

a superincumbent layer of material surrounding said electrical detector and wicking material that is operative on contact with said leaked coolant for hardening to form a seal that contains said leaked coolant; and means coupled to said electrical detector for indicating the presence of a coolant leak in response to said altering of said electrical parameter.

16. The leak detection apparatus of claim 15, wherein said superincumbent layer of material is hydrophobic polyurethane.

\* \* \* \* \*